United States Patent [19]

Von Holdt

[11] Patent Number: 4,487,564
[45] Date of Patent: Dec. 11, 1984

[54] SPLIT MOLD LOCK

[76] Inventor: John W. Von Holdt, 6864 Lexington La., Niles, Ill. 60648

[21] Appl. No.: 490,180

[22] Filed: Apr. 29, 1983

[51] Int. Cl.³ ............................................. B29C 1/16
[52] U.S. Cl. ................................. 425/451.9; 425/595; 249/160
[58] Field of Search ............ 425/192 R, 151.9, 151.1, 425/DIG. 5, 163, 165, 167, 168, 169, 595; 52/127.5, 125.2

[56] References Cited

U.S. PATENT DOCUMENTS

| | | | |
|---|---|---|---|
| 2,319,479 | 5/1943 | Ryder | 425/451.9 |
| 3,004,291 | 10/1961 | Schad | 425/451.9 X |
| 3,063,594 | 11/1962 | Gerard et al. | 425/451.9 X |
| 3,310,842 | 3/1967 | Fischbach | 425/595 X |
| 3,460,197 | 8/1969 | Cantarutti et al. | 425/47 X |
| 3,465,386 | 9/1969 | Brown | 425/595 X |
| 3,543,344 | 12/1970 | Hunt | 425/DIG. 5 |
| 3,565,388 | 2/1971 | Katz | 425/589 X |
| 3,687,590 | 8/1972 | Cyriax | 425/450.1 X |
| 3,737,268 | 6/1973 | Ryder | 425/192 |
| 3,825,396 | 7/1974 | Koutz | 425/451.9 X |
| 4,174,939 | 11/1979 | Fenner | 425/451.9 |
| 4,245,971 | 1/1981 | MacMillan | 425/451.9 X |
| 4,248,583 | 2/1981 | Hedke et al. | 425/451.9 X |
| 4,315,727 | 2/1982 | Black | 425/451.9 X |
| 4,403,810 | 9/1983 | Bieneck | 425/451.9 X |

Primary Examiner—J. Howard Flint, Jr.
Attorney, Agent, or Firm—Charles F. Pigott, Jr.

[57] ABSTRACT

A split-mold safety lock for preventing unintended separation of mold components during lifting and manipulation thereof. The invention employs a split ring capable of being swiveled in a circle of 360° and being pivoted in an arc of 180° around a perpendicular axis there in a base. A safety lock is associated with the ring base for permitting separation of the molds for a molding operation and to automatically assume a locked configuration upon lifting. The split-mold lock is capable of being utilized on multiple parting lines of a plurality of mold parts.

7 Claims, 4 Drawing Figures

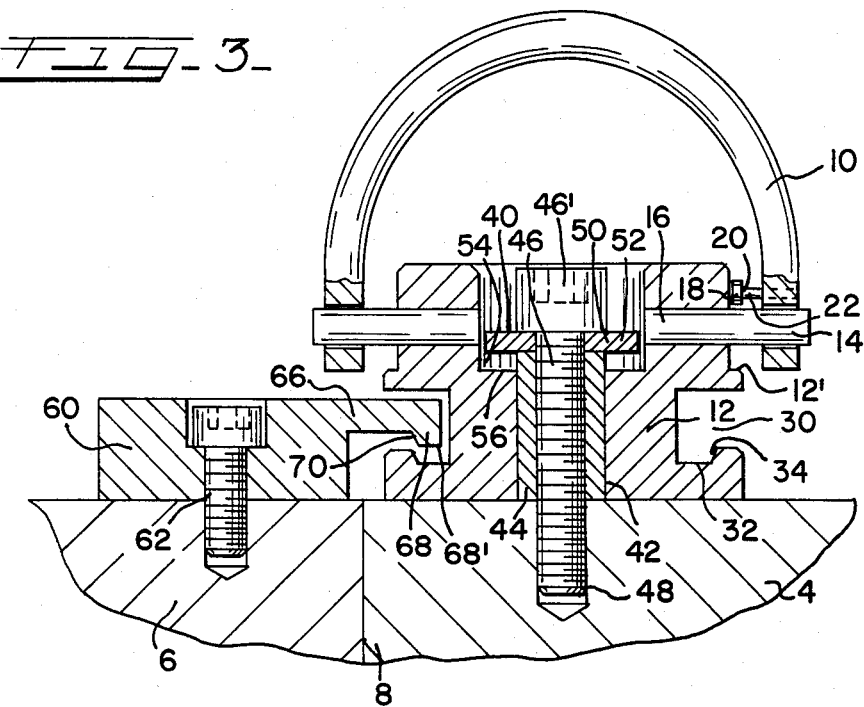
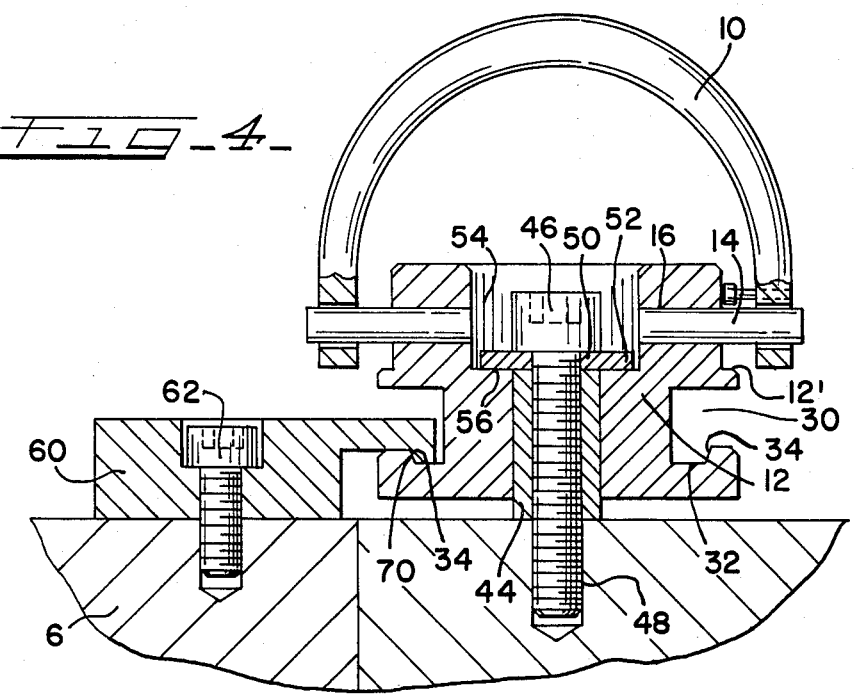

SPLIT MOLD LOCK

BACKGROUND OF THE INVENTION

This invention relates in general to molding assemblies and, in particular, to safety devices associated with separable mold components.

More specifically, but without restriction to the particular use which is shown and described, this invention relates to a split-mold lock for use with the separable components of a mold assembly having one or more parting lines. The split-mold lock of the invention is capable of automatically assuming a locked configuration to prevent separation of the mold components during lifting and manipulation, while permitting separation when the mold assembly is supported by support elements. The mold lock of the invention allows an operator to lift mold components as a unit and lift them without the fear of undesired separation. The mold lock attains automatic release of the components when returned to an operative position in association with a press.

In the art of molding, such as in the fabrication of plastic containers and the like, it is common to mold an article within a mold assembly having a suitable cavity and die design provided by separate mold sections that are moved together in a mold press. After using a specific unit for a desired number of operations, it may be necessary to replace the mold assembly in use with another unit of different design. The changeover is accomplished by lifting the prior separable mold from the press by a hook or other implement and transferring it to a storage area or other use. It is during the carrying of a mold from the press when a particularly dangerous situation is created by such handling.

In prior art designs, the closed molds are lifted by numerous techniques, such as by contact with a ring of a handle, which is mounted on one of the mold sections. Since this ring is only mounted on a single mold section, it is common for the sections of the mold to separate during lifting and create a hazard to the operator or cause potential damage to a component. As a protection against undesired separation of the components at a parting line, one known technique of locking the mold sections together employs a strap plate anchored to adjoining sections across the parting line. The attachment and removal of such a fixed safety device is inconvenient and time consuming, since it must be affixed prior to lifting. On occasion, this technique is potentially dangerous when a mold is returned to use on the press and is separated with the safety plate in place, since the screws may pop outward as projectiles. The problems in the prior art of providing protection against disjointing of mold sections during transport is aggravated in situations involving molding assemblies having several molding components and parting lines.

SUMMARY OF THE INVENTION

It is, therefore, an object of this invention to provide a safety device to prevent the undesired separation of separable parts of the mold assembly.

Another object of this invention is to attain automatic engagement and disengagement of a locking mechanism coupling two or more components of a mold assembly.

A further object of this invention is to attain locked engagement of sections of a separable mold assembly without manual operation.

Still another object of this invention is to automatically lock two or more separable parts of a mold assembly when approached from any direction.

A still further object of this invention is to provide a safety lock assembly for a mold assembly which is inexpensive to manufacture, easily installed, and simple to use.

These and other objects are attained in accordance with the present invention wherein there is provided a split-mold lock assembly to prevent separation of two or more separable parts of a mold assembly during lifting or other manipulation. The mold lock of the invention is capable of automatically permitting relative movement between separable parts upon the mold being directed supported. The split-lock assembly herein disclosed attains a locked configuration by the simple act of lifting the mold assembly without any additional manipulations being necessary. The assembly is further arranged to be used with a plurality of separable parts in a mold assembly such as used with molding techniques having more than one parting line. The locking mechanism attains firm and effective engagement of the components in a locked configuration without the use of springs or other moveable elements and does not interfere with the molding operation.

DESCRIPTION OF THE DRAWINGS

Further objects of the invention together with additional features contributing thereto and advantages accruing therefrom will be apparent from the following description of a preferred embodiment of the invention which is shown in the accompanying drawings with like reference numerals indicating corresponding parts throughout, wherein:

FIG. 3 is a partial sectional view taken along lines 3—3 of FIG. 2 showing the split-mold lock assembly of the invention in a released configuration permitting separation of the parts of the mold at the parting line; and FIG. 4 is a sectional illustration taken along lines 3—3 of FIG. 2 showing the split-mold lock assembly of the invention in a locked configuration during lifting preventing separation of the parts of the mold assembly.

DESCRIPTION OF THE PREFERRED EMBODIMENT

Figure 1:
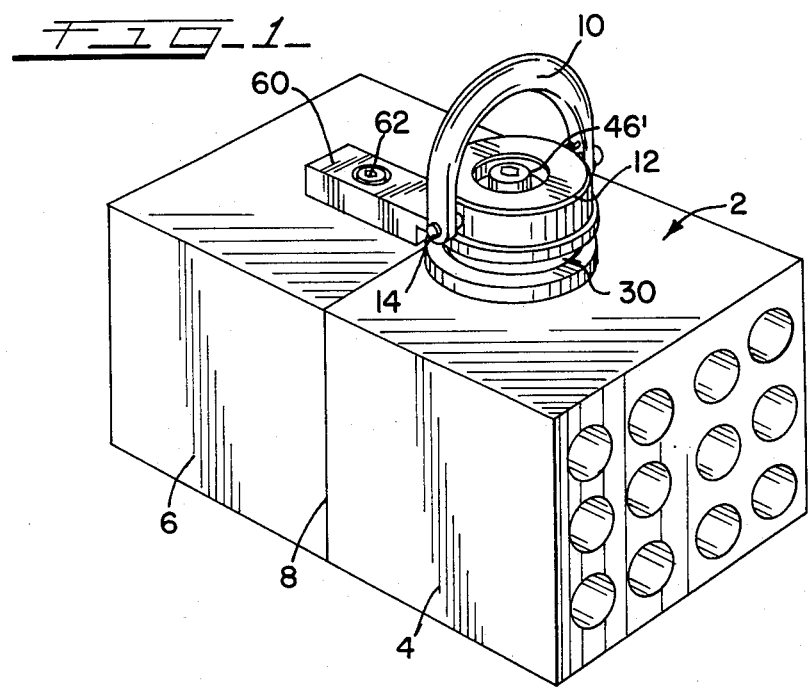
FIG. 1 is a perspective side view of a separable mold assembly having the split-mold lock assembly of the invention mounted thereon.

Referring now to FIG. 1, there is illustrated a separable molding assembly 2 having sections 4 and 6 that are separable at parting line 8. The sections 4 and 6 are conventional in construction and include suitable cavities and die elements to form a molded article from plastic and the like in a manner well known in the art. During a molding operation, parts 4 and 6 of separable mold 2 are mounted in a mold press (not shown) and are moved relative to each other. In the close condition, contact is generally made at parting line 8. To remove the mold 2 from the press for storage or other use or to mount it on a press, the operator normally lifts the assembly from position to position carrying the separable parts 4 and 6.

The lifting, lowering and other manipulation of the mold 2 is accomplished, in accordance with the invention of the application, through engagement of a split ring assembly 10 mounted on one of the separable parts 4, 6 of the mold. The ring assembly 10 is pivotally mounted upon a metal base 12 having generally a cylindrical configuration with modifications. The split ring 10 is carried on base 12 by means of a pair of shafts 14 press fitted into holes 16 disposed on diametrical opposite sides of base 12. The pins 14 mount the split ring 10 for pivotal movement around the axis of the pins. To control the extent of pivotal action of the ring 10, a pin 18 having an enlarged end 20 is secured to the ring 10 adjacent one of the pins 14. The periphery 22 of the enlarged end 20 engages a shoulder 12' forming the base 12 to limit its movement toward the mold.

A circumferentially extending, open channel 30 is cut out of the lower portion of the base 12. The lower surface 32 defining the circumferential groove 30 is formed with an internal continuous slot 32 to form a slightly sloped annular-like stop shoulder 34. The base 12 is mounted for 360° swiveling movement around an axis perpendicular to the pivotal movement of the split ring 10 by a bolt and sleeve arrangement 40 centrally mounted within a hole 42 through the base. A metallic sleeve 44 is mounted on a threaded bolt 46 within a portion of hole 42.

The threaded bolt 46 extends downward through the sleeve 44 and has an end which engages a threaded hole 48 provided in one of the parts 4 or 6 of the mold. A metal washer-like member 50 is imposed between the head 46' of the bolt and the end of sleeve 44. The outer peripheral area 52 of the washer-member 50 projects radially outward beyond the periphery of sleeve 44 and is accomodated within an enlarged diameter portion 54 of the hole 42. The bottom of the enlarged portion of the hole 54 provides an annular shoulder 56 which is capable of engaging a bottom portion of the peripheral section 52 of washer 50. As seen in FIG. 4, the length of sleeve 44 is greater than the distance between the annular surface 56 and the bottom of the base 12. The base 12 may then undergo movement relative to the fixed sleeve 44 for moving between the position shown in FIG. 3, at which the bottom of the base rests on molding section 6, and the position shown in FIG. 4 at which the shoulder 56 engages the bottom of section 52 of the washer 50. In the position shown in FIG. 4, the application of an upward lifting force on split ring 10 will cause the mold to be lifted as a unit upward since the bolt is threaded into engagement with the mold section 4, 6.

Figure 2:
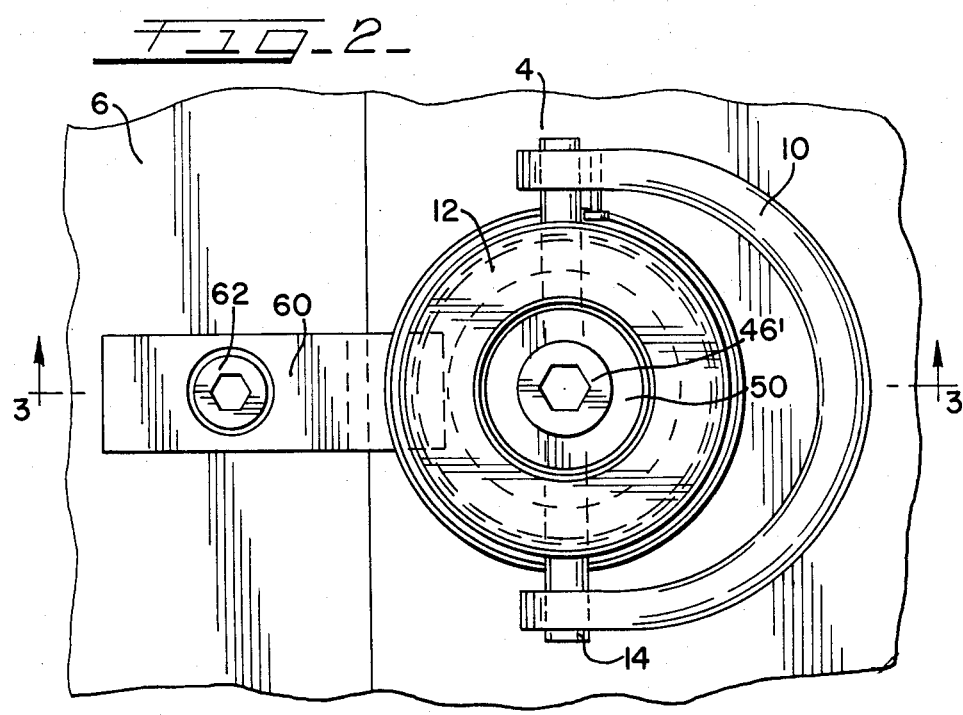
FIG. 2 is a top partial schematic view, with parts shown in phantom, of the split-mold lock assembly of FIG. 1.

As best shown in FIG. 2, a modified flat plate 60 is affixed by means of one or more threaded elements 62 to the opposite mold 6 at a position radially in alignment with the axis of the threaded shaft 48. An end projecting portion 66 at the top of plate 60 extends outward beyond and above the parting line 8 in a closed configuration of the mold sections and is arranged to extend into the slot 30 in a manner shown in FIG. 3, while the base 12 is supported. The end portion of the projection 66 has a downward tongue 68 formed with a stop surface 70 to engage a portion of the shoulder 34 provided in groove 30. It should be apparent that in the configuration of FIG. 3 the mold sections 4 and 6 may be separated, since the bottom of the downward projection 68 is disposed in a plane aligned above the top of the uppermost portion of the bottom 32 of the groove 30. Thus, clearance is provided to permit the parts to be separated.

As the molds are lifted, however, the weight of the mold causes the base 12 to move relative to the sleeve 44, and the surface 56 engages the washer 40. The engagement between the surface 70 and the surface 34 of the groove 30 is automatically achieved as shown in FIG. 4, such that the two mold sections 4 and 6 become inseparable. Such a locking action is attained automatically because it is responsive to lifting of the mold. Inasmuch as the groove 30 opens circumferentially around the base 12, the ring 10 can be disposed in any angular relationship in respect to the axis of the threaded shaft 46 in light of the clearance shown in FIG. 3 existing between the lock and the base.

In the preceding embodiment, the split-mold lock assembly of the invention is described with reference to a pair of mold components separable at parting line 8. In many applications, multiple parting lines may be present on which additional plates 60 of the construction as shown in FIGS. 3 and 4, with a length as required can be arranged to extend into a groove 30 of a single base 12 retaining multiple sections.

While the invention has been described with reference to a preferred embodiment, it will be understood by those skilled in the art that various changes may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A mold lock assembly for separable mold parts having a parting line between said mold parts of a mold assembly comprising:
   a base means for attachment to one of at least two parts of separable mold assembly for molding articles,
   lock means operatively coupled to each of the other of said at least two parts and being arranged to attain either a locked or released relationship with said base means, one of said base means and said lock means overlapping the parting line of adjacent parts, and
   said base means having means to create said locked relationship between said lock means and said base means from said overlapping of the parting line during lifting of said base means for manipulating said locked mold assembly, said locked relationship preventing separation of said at least two parts.

2. The mold lock assembly according to claim 1 wherein said lock means and base means assume a released position upon removal of the force on said base means.

3. The mold lock assembly according to claim 2 wherein said base means moves relative to said lock means upon application of said lifting of said base means to attain said locked configuration.

4. The mold lock assembly according to claim 3 wherein a portion of said lock means extends into an open slot provided in said base means during closing of the at least two parts of the mold assembly.

5. The mold lock assembly according to claim 4 wherein the outer surface of said base means has a cylindrical configuration and said open slot extends circumferentially therearound.

6. The mold lock assembly according to claim 5 wherein said base means is mounted for swiveling movement on said one of said separable parts.

7. The mold lock assembly according to claim 6 further including a split ring mounted on said base means.

* * * * *